Sheet 1, 2 Sheets.

J. D. King.
Tobacco Press.

No. 3,593. Reissued Aug. 10, 1869.

Witnesses
J M Covington
Theo Fitzel

Inventor
J D King
By Munn & Co
Attys

N. PETERS, PHOTO-LITHOGRAPHER, WASHINGTON, D. C.

Sheet 2, 2 Sheets.

J. D. King.
Tobacco Press.

No. 3,593. Reissued Aug. 10, 1869.

Witnesses
J. M. Connolon
Thos. Tusel

Inventor
J. D. King
By Munn & Co
Attys

N. PETERS, PHOTO-LITHOGRAPHER, WASHINGTON, D. C.

UNITED STATES PATENT OFFICE.

J. D. KING, OF TORONTO, CANADA WEST.

IMPROVED TOBACCO-PRESS.

Specification forming part of Letters Patent No. 48,955, dated July 25, 1865; Reissue No. 3,593, dated August 10, 1869.

*To all whom it may concern:*

Be it known that I, JOHN D. KING, formerly of Cincinnati, in the county of Hamilton and State of Ohio, but now residing in Toronto, Canada West, have invented certain new and useful Improvements in Machinery for Pressing Tobacco, of which the following is a full, clear, and exact description.

The object of the first part of my invention is to press leaf-tobacco into strips, which may be afterward cut into plugs of proper size; and the improvement consists, first, in combining a rotating pressing-roller with a bed traversing beneath the roller and carrying a trough to hold the tobacco.

The object of the next part of my invention is simultaneously to roll several strips of different widths; and the improvement consists, second, in combining a series of pressure-rollers of different widths, mounted side by side on a common axis, with troughs of correspondingly varied widths mounted on a bed traversing beneath the rollers.

The object of the next part of my invention is to allow the rollers to yield when required, to prevent breakage; and the improvement consists, third, in combining yielding pressure-rollers with troughs traversing on a bed driven by a drum underneath the bed.

The object of the next part of my invention is properly to support the bed; and the improvement consists, fourth, in combining the pressure-rollers, the traversing bed, and its driving-drum with supporting-rollers underneath the bed and on each side of the drum.

Fifth, the improvement further consists in combining pressure-rollers, a traversing bed carrying rack-teeth, a driving-drum, and supporting-rollers grooved to receive the rack-teeth, and thus prevent the lateral displacement of the bed.

Figure 1:
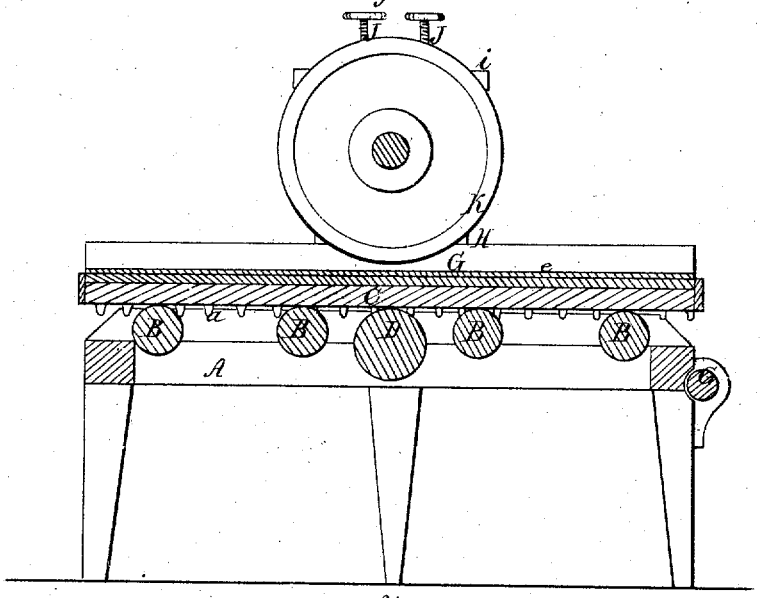
Figure 2:
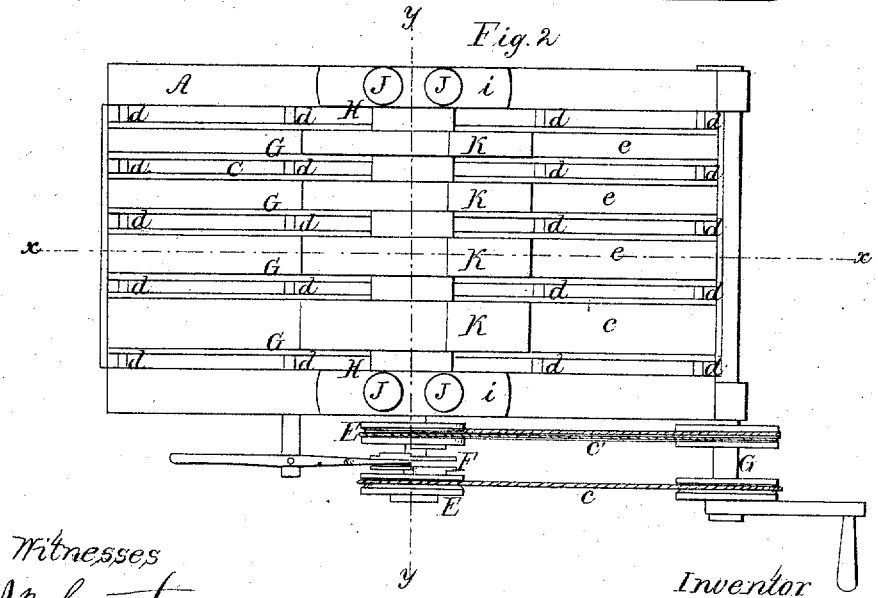
Figure 3:
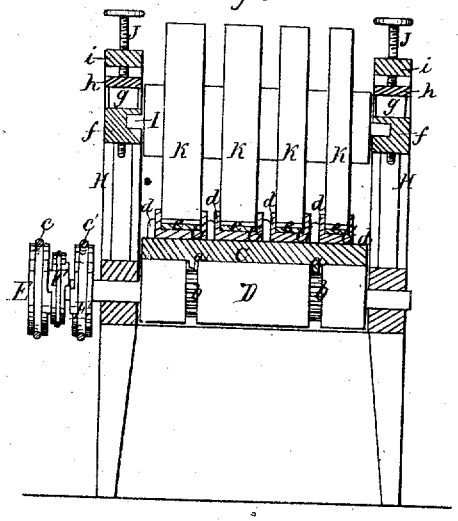
Figure 4:
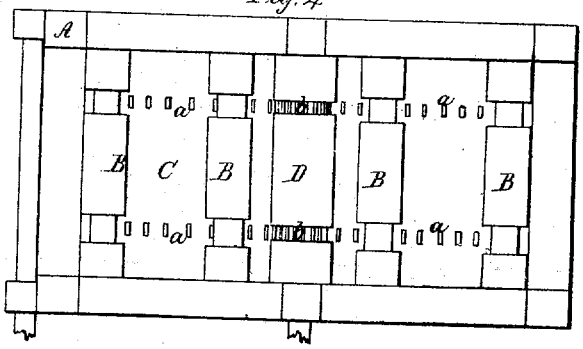

In the accompanying drawings, which make part of this specification, Figure 1 represents a vertical longitudinal section through my improved machine at the line *x x* of Fig. 2. Fig. 2 represents a plan or top view of the same. Fig. 3 represents a vertical transverse section through the machine at the line *y y* of Fig. 2. Fig. 4 represents a plan view of the under side of the machine.

In order to carry out the objects of my invention I mount a stout frame, A, on proper supports. Rollers B are mounted in suitable bearings on this frame, and support a bed or sliding frame, C, arranged to be traversed back and forth over the rollers B by means of racks or teeth *a* on its under side, which engage with the teeth of gears *b* on a drum, D. The rollers B and drum D are recessed so that the rack-teeth may traverse in the recesses. This drum is alternately rotated in opposite directions in the following manner: Two pulleys on a driving-shaft, G′, drive two corresponding pulleys, E E′, on the shaft of the drum D by bands *c c′*, one of which is straight, while the other is crossed; consequently the two pulleys E E′ rotate continuously in opposite directions. A sliding clutch, F, is so arranged on the shaft of the drum D that while free to be moved endwise on the shaft (by means of its shipping-lever) it yet turns with it; consequently when the clutch F is in gear with one of the pulleys E E′ the drum is rotated in one direction, and when in gear with the other this movement is reversed, together with that of the bed C. Pins *d* are inserted in the upper side of the bed C in rows parallel with its length. Boxes or troughs G are placed lengthwise of the bed between these rows of pins. These boxes or troughs may be of wood lined with sheet metal, and are each provided with a false or supplemental bottom, *e*, which may be of wood. A shaft, I, is mounted in bearings *f* in uprights or standards H, secured upon the frame A, in which uprights the shaft can be raised or lowered by means of set-screws J, which pass through the bearings *f*, through rubber springs *g* above the bearings, through plates *h* above the springs, and through cap-pieces *i* on the uprights.

On the shaft I is mounted a series of rollers, K, of different widths, corresponding with those of the troughs G, thus forming plugs of different widths.

The operation of the machine is as follows: The troughs are removed from their bed and filled with tobacco properly prepared for pressing. The tobacco may be weighed so that each box or trough will be supplied with a certain weight. The troughs are then replaced on the bed C. The pressure of the rollers K may be adjusted by means of the adjusting-screws J, so that the tobacco in the trough will be subjected to a proper pressure. When the troughs have been placed in position, the bed is moved backward and forward underneath the rollers K by means of the mechanism above described, so as to subject the tobacco to two successive pressings, and the latter pressure may be increased by turning down the set-screws J. Two pressings will generally be found sufficient, after which the troughs are removed and the compressed strip taken out by lifting the false bottoms *e* of the troughs. Any number of these boxes or troughs may be employed, one set of hands filling the troughs and another removing the compressed tobacco therefrom. The rollers K may be of different widths, as above mentioned, or may all be made of uniform dimensions. The tobacco, after being compressed, may be cut into strips of any desired length or weight. I thus by my invention obtain a simple and effective device for compressing tobacco into plugs. The recesses in the rollers and drums, in which the racks *a* traverse, bear against the teeth of the rack and prevent the bed from moving sidewise.

What I claim as my invention, and desire to secure by Letters Patent, is—

1. The combination of a rotating pressing-roller, the traversing bed, and the interposed removable trough, the combination being and operating substantially as set forth.

2. The combination of pressing-rollers of different widths, mounted on a common axle, with troughs of correspondingly different widths, mounted on a traversing bed, the combination being and operating substantially as set forth.

3. The combination of yielding-spring pressure-rollers, traversing troughs, the traversing bed, and its driving-drum D, the combination being and operating substantially as set forth.

4. The combination of the bed, the driving-drum D, the supporting-rollers, and the pressure-rollers, the combination being and operating substantially as set forth.

5. The combination of the pressure-rollers, the bed, its rack, the grooved driving-drum, and the grooved supporting-rollers, all constructed for joint operation substantially as set forth.

J. D. KING.

Witnesses:

JNO. WINCHESTER,
*Of the city of Toronto, student at law.*

HENRY B. MURPHY,
*Of Toronto, barrister at law.*